(12) United States Patent
Laserson et al.

(10) Patent No.: US 11,704,717 B2
(45) Date of Patent: Jul. 18, 2023

(54) ITEM AFFINITY PROCESSING

(71) Applicant: NCR Corporation, Atlanta, GA (US)

(72) Inventors: Itamar David Laserson, Givat Shmuel (IL); Rotem Chudin, Kfar-Saba (IL); Julie Dvora Katz Ohayon, Ashdod (IL); Moshe Shaharur, Tel-Aviv (IL)

(73) Assignee: NCR Corporation, Atlanta, GA (US)

( * ) Notice: Subject to any disclaimer, the term of this patent is extended or adjusted under 35 U.S.C. 154(b) by 146 days.

(21) Appl. No.: 17/030,554

(22) Filed: Sep. 24, 2020

(65) Prior Publication Data
US 2022/0092670 A1 Mar. 24, 2022

(51) Int. Cl.
*G06Q 30/06* (2023.01)
*G06Q 30/0601* (2023.01)
*G06N 20/00* (2019.01)
*G06F 40/242* (2020.01)
*G06Q 10/0875* (2023.01)

(52) U.S. Cl.
CPC ....... *G06Q 30/0631* (2013.01); *G06F 40/242* (2020.01); *G06N 20/00* (2019.01); *G06Q 10/0875* (2013.01); *G06Q 30/0603* (2013.01)

(58) Field of Classification Search
CPC .......... G06Q 30/0603; G06Q 30/0631; G06Q 10/0875; G06F 40/242; G06N 20/00
USPC ....................................................... 705/26.7
See application file for complete search history.

(56) References Cited

U.S. PATENT DOCUMENTS

2003/0217052 A1* 11/2003 Rubenczyk ........... G06F 16/951
2004/0024705 A1* 2/2004 Chernomorov ........ G06Q 30/06
705/40
2008/0209351 A1* 8/2008 Macadaan ............... G06F 16/54
715/762
2017/0372280 A1* 12/2017 Egedy .................... G06Q 20/12
2018/0157637 A1* 6/2018 Grant .................... H04L 67/566

(Continued)

FOREIGN PATENT DOCUMENTS

| CN | 108780647 A | * 11/2018 | ........... G10L 19/008 |
|---|---|---|---|
| WO | 2019/145395 | 8/2019 | |
| WO | 2019/145395 A1 | 8/2019 | |

OTHER PUBLICATIONS

Collaborative filtering driven by fast semantic feature analysis on Spark Peng Yang1,2,3 • Liang Gu1,2,3 • Xuan Liu1,2,3 Springer Science+Business Media, LLC, part of Springer Nature 2018, retrieved from Dialog database on Jul. 11, 2022 (Year: 2018).*

(Continued)

*Primary Examiner* — Yogesh C Garg
(74) *Attorney, Agent, or Firm* — Schwegman Lundberg & Woessner, P.A.

(57) ABSTRACT

Item codes for items are mapped to multidimensional space as item vectors based on transaction contexts. Similarities between item codes are based on distances between the item codes within the multidimensional space. Substitute items for out-of-stock items are automatically identified based on the item similarities and based on collected feedback from transactions. The substitute items are provided in real time to customers during transactions, item picking services during item fulfillment, and shelf management services for item shelf stocking. In an embodiment, the substitute items are further determined based on a specific transaction history for a given customer and specific feedback collected for the given customer from the specific transaction history.

13 Claims, 4 Drawing Sheets

(56) References Cited

U.S. PATENT DOCUMENTS

| | | |
|---|---|---|
| 2019/0130425 A1 | 5/2019 | Lei et al. |
| 2019/0206555 A1* | 7/2019 | Morgan ................. G16H 40/40 |
| 2020/0019632 A1* | 1/2020 | Larchev .............. G06N 3/0445 |
| 2021/0027302 A1* | 1/2021 | Resheff ................. G06N 20/20 |
| 2021/0035188 A1* | 2/2021 | Ksyta ................. G06Q 30/0601 |
| 2021/0217073 A1* | 7/2021 | Laserson ................. G06N 5/04 |
| 2021/0233101 A1* | 7/2021 | Laserson ............. G06K 9/6223 |

OTHER PUBLICATIONS

Kang, Wangcheng; "Building Visually-Aware, Dynamic, and Efficient Recommender Systems"; Published in ProQuest Dissertations and Theses ProQuest Dissertations Publishing. (2020); retrieved from Dialog Database on Nov. 16, 2022 (Year: 2020).*

Huang, Jiayuan; "Learning from partially labeled data: Unsupervised and semi-supervised learning on graphs and learning with distribution shifting"; ProQuest Dissertations and Theses ProQuest Dissertations Publishing. Waterloo, Ontario Canada (2007); retrieved from Dialog database on Feb. 26, 2023 (Year: 2007).*

EP Search Report.

20-0158 India 202144013283_ExaminationReport dated May 26, 2022.

* cited by examiner

ITEM AFFINITY PROCESSING

BACKGROUND

The COVID19 pandemic has exposed many issues with retail supply chains and inventory management. Customer fears of being locked up at home without their essentials have caused many products to be unavailable on retailer shelves. Lack of raw materials, such as aluminum, due to unusual high sales along specific product lines has also caused manufacturers to halt production of some products that rely on the raw materials for packaging. The result has been a five-fold increase in online sales as customers worry about the risk of venturing out to stores and worry that once they get to the stores their essentials will be out-of-stock anyway. Consequently, with the high demand for online sales and reduced inventories for high-demand product brands, delivery delays for ordered products are also now routine in the industry.

A recent study indicated that in 63% of out-of-stock cases, the retailer experiences lost sales and even customer defections to different retailers. Out-of-stock retailers are quickly learning a hard lesson that they need to respond immediately to their customers with a correct and acceptable substitute product or they will face a substantial drop in revenues, and they may also lose future business from previous loyal customers.

Pre-pandemic studies showed that an out-of-stock incident occurs in 1 out of 3 online orders or in-person store visits. During the acute phases of the pandemic, grocery retailers reported that the frequency of out-of-stock incidents were increased by a factorial rate of 5 to 6. The exponential growth in out-of-stock incidents is a "perfect storm" for retailers who are struggling to survive during the pandemic. Margins are already small for grocery retailers; so, the lost sales and the lost customer loyalty, which are associated with out-of-stock products, are forcing many retailers to close down with many more retailers currently on the brink of closure.

SUMMARY

In various embodiments, methods and a system for item affinity processing are presented.

According to an aspect, a method for item affinity processing is presented. For example, item codes of a product catalogue and mapped to vectors plotted in multidimensional space based on contexts of the item codes within a transaction history. Each item code is assigned to a corresponding item vector. Substitute item codes for a given item code that is out-of-stock is provided based on similarity values calculated from first vectors associated with the substitute item codes and a second vector associated with the given item code.

DETAILED DESCRIPTION

Figure 1A:
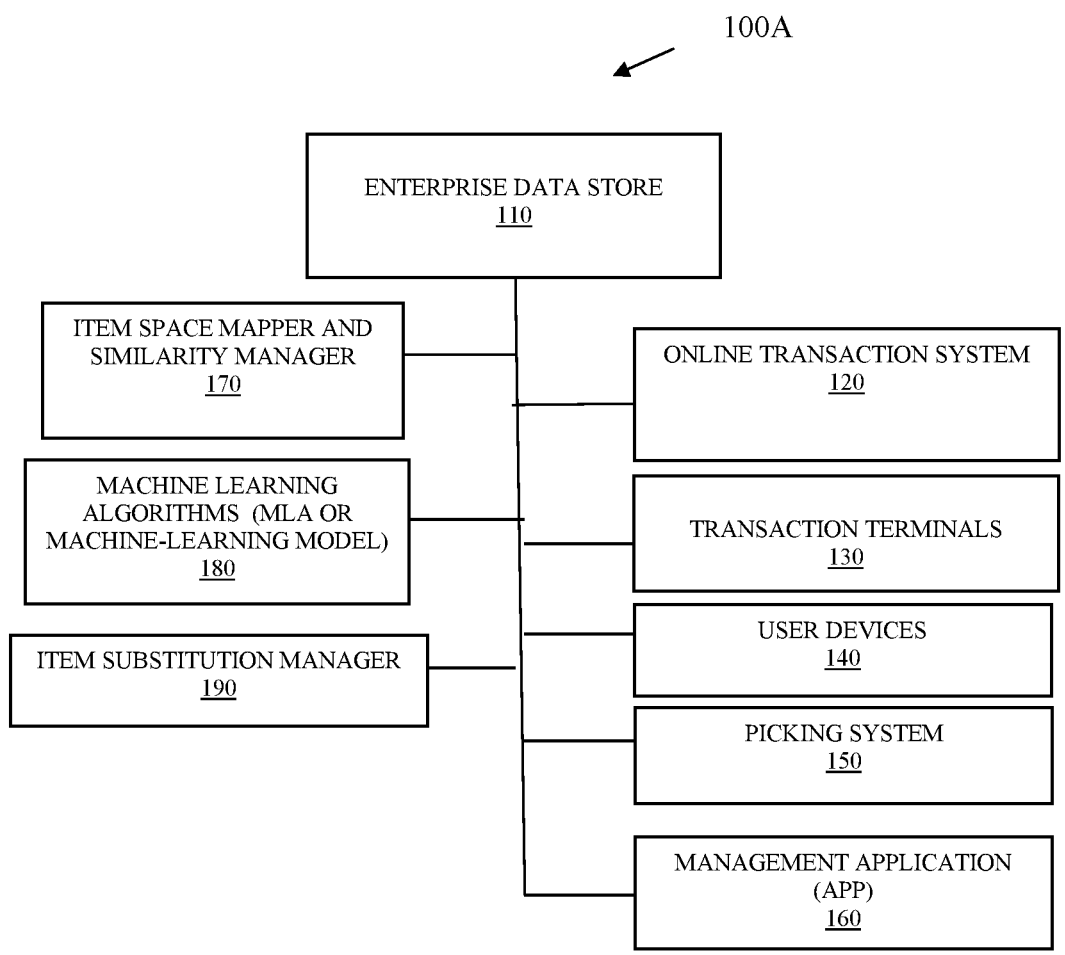
FIG. 1A is a diagram of a system for item affinity processing, according to an example embodiment.

FIG. 1A is a diagram of a system 100 for item affinity processing, according to an example embodiment. It is to be noted that the components are shown schematically in greatly simplified form, with only those components relevant to understanding of the embodiments being illustrated.

Furthermore, the various components (that are identified in the FIGS. 1A and 1B) are illustrated and the arrangement of the components is presented for purposes of illustration only. It is to be noted that other arrangements with more or less components are possible without departing from the teachings of item affinity processing presented herein and below.

The system 100A provides a mechanism by which item codes for items of a product catalogue are mapped to multidimensional space as item vectors representing contexts between each item within multidimensional space. The contexts are derived as patterns having the items detected within transaction histories. Similarities between items are determined based on distances between item codes within the multidimensional space. Specific replacement items are provided as an alternative to out-of-stock items based on the similarities and based on feedback observed in transactions with respect to proposed replacement items. Replacement items for out-of-stock items are provided in real time to customers during online transactions, to picking services during customer order fulfillment, and to in-store management applications for managing shelf space of the out-of-stock items. Replacement items suggested to customers during online transactions are further customized based on that customer's specific transaction history and that customer's previously collected feedback. The System 100A provides an item affinity model from which machine-learning is used to identity relationships and affinities between items, the model can be used for providing recommendations for replacement or substitute items that are out-of-stock; however, it is noted that the model can be used for other applications as well when relationships between items are needed or beneficial.

According to a recent study, items being out-of-stock when customers are visiting stores or engaging in online transactions that are not followed immediately by effective in-stock substitute item suggestions, is the third-most common complaint of retail customers and accounts for approximately 30% of all customer complaints. This study also found that approximately 37% of current out-of-stock incidents result in a customer buying a different brand in the same store. The outcome of the remaining 63% is more problematic for the retailer because the customer in these instances later buys the out-of-stock item from a competitor of the retailer. The most common use cases where retailers need to respond quickly and correctly with substitute items are:

(1) Order fulfillment—when handling an order fulfillment task, in-store pickers often have to provide a replacement to an out-of-stock item. This causes a major overhead to the order fulfillment process. Pickers need to identify alternatives that are often based on their own intuitions and verify it with the customer. Today, since online shopping has accelerated during the pandemic along with out-of-stock incidents, many new staff members have been recruited and they have no experience not intuition related to item substitution. Lacking any effective solution during the COVID19 pandemic, many retailers have eliminated item substitutions from their order fulfillment process causing millions of dollars in lost potential sales revenue.

(2) E-commerce: in some cases, out-of-stock items are known at the time that an order is placed. In such cases, retailers want to identify and suggest an effective substitution on the retailers' e-commerce sites during the online orders. This use case is relevant more than ever before due to the exponential increase in online shopping and a new normal in society associated with social distancing during the pandemic.

(3) Empty shelf: empty shelves are a poor visual to customers at brick-and-mortar stores. These are situations store managers wish to avoid since it gives the impression that the store does not maintain their inventories. Merchandisers/Store managers should quickly respond to such cases and replenish the shelves with the most effective or most similar substitute. With so many out-of-stock incidents during the pandemic, this has become a critical issue for physical stores on a global scale. The lack of an effective mechanism to suggest a product/item substitution in real time causes some major pain-points for the retailer, which include:
  (a) Revenue loss—customer consequently chooses to buy the out-of-stock item at the competitor store or chooses not to buy at all.
  (b) Reduced loyalty—decreased customer satisfaction and increased risk for customer churn.
  (c) Increased operational cost—failing to provide an adequate substitute will often result in the retailer offering "rain checks," unplanned restocking, or looking for stock in back storage areas, which results in a substantial amount of overhead for the retailer.

As will be illustrated more completely herein and below, these issues are solved by system 100A, process flow 1006, method 200, and method 300. Furthermore, the teachings herein conforms with the modernization and digital transformation trends predicted for the retail industry following the world-wide COVID19 outbreak. The techniques presented for out-of-stock handling is both automatic and data-driven (meaning based on real observations from past record transactions and not based on presumptions).

System 100A comprises an enterprise data store 110, an online transaction system 120, in-store transaction terminals 130, user devices 140, a picking or order fulfillment system 150, a management application (app) 160, an item space mapper and similarity manager 170, one or more machine-learning algorithms (MLA) 180, and an item substitution manager 190. System 100A comprises a variety of computing devices, each of which comprises at least one processor and a non-transitory computer-readable storage medium comprising executable instructions. The executable instructions when executed by the corresponding processor from the corresponding non-transitory computer-readable storage medium causes that processor to perform operations discussed herein and below with respect to the components 110-190.

An "item code" represents an item from a given retailer's product catalogue. Each item code's affinity/similarity to the other item codes defines that item's vector in multidimensional space. The affinity/similarity and item code vector determined by Word2Vec algorithms based on analysis of the retailer's transaction histories and product catalogue. An "item vector" is a mathematical expression showing points within the multidimensional space representing the contexts of a given item.

Enterprise data store 110 includes a variety of enterprise data, such as transaction histories for transactions performed with a retailer. Other types of data may be included in enterprise data store 100 as well, such as incentives available to consumers, customer data for known customers (loyalty data, profile data, etc.), the transaction details for transactions of customers (including item codes for items), item or product catalogue data, and other information captured and retained by the enterprise for the store and other stores associated with the enterprise (retailer).

Online transaction system 120 comprises interfaces and corresponding software by which customers perform online transactions with a retailer, such as via browsing items, storing selected items in a virtual card, and checking out (paying for) items in the virtual cart. The online transaction system 120 can be web-based and/or mobile app-based. Virtual cart data provided in real time from online transaction system 120 to enterprise data store 110 or provided via an Application Programming Interface (API) in real time to item substitution manager 190 during an online shopping session when a selected item for the virtual card is out-of-stock.

Transaction terminals 130 comprise peripheral devices (scanners, printers, media acceptors/dispensers, weigh scales, Personal Identification Number (PIN) pads, card readers, etc.) and corresponding software for performing customer checkouts associated with transactions. Real-time item and transaction data provided by terminals to enterprise data store 110.

User devices 140 comprise peripherals (touchscreens, cameras, etc.) and corresponding software for performing customer transactions using a web browser or a mobile application (app). Real time transaction data provided by any app to enterprise data store 110.

Picking system 150 comprises devices and corresponding software and user interfaces for performing order fulfillment of orders within the store. Any item present in a given order that is out-of-stock causes a request to be sent, via an API, to item substitution manager 190 for a substitute item (the event including the order/transaction information being fulfilled through the picking system 150 and identification of the item code associated with the out-of-stock item).

Item space mapper and similarity manager 170 initially generates vectors for item codes in a product catalogue (obtained from enterprise data store 110) using transaction histories (again, obtained from enterprise data store 110). In this manner, the item codes in the product catalogue are assigned vectors that map to multidimensional space. Each vector linked to the item codes of the product catalogue. "Item embedding" is applied using a "Word2Vec" algorithm. Word2Vec is a group of algorithms used primarily in the field of Natural Language Processing (NLP) for machine translation. The Word2Vec takes as its input a large corpus of text (product catalogue of item codes and transaction histories from enterprise data store 110) and produces a vector space of typically several hundred dimensions (multidimensional space), each unique word (item code) in the corpus being assigned a corresponding unique vector plotted in the multidimensional space. In this way, item codes that share common contexts within the transaction histories are plotted in close proximity to one another within the multidimensional space. The transaction histories are provided as sentences to the Word2Vec algorithm and the words are the item codes (all words available are identified from the product catalogue). Mathematical calculations can be applied on the vectoral numeric representations (vectors) for the item codes.

Once the product catalogue and transaction histories are processed to create the item code vectors for the items, item space mapper and similarity manager 170 can be provided a given item code (as input or as a request for a suggested item replacement code), the given item code representing an item that is out-of-stock and can be generated from any of components 120-160. The output produced by the Word2Vec algorithm is replacement item codes (replacement items) along with similarity scores (which correspond to the distances within the multidimensional space between the position of item code that is out-of-stock and the positions of replacement item codes). Item space mapper and similarity manager 170 can determine the specific suggested substitute/replacement codes to provide item substitution manager 190 based on a preset threshold value or range of values and/or based on a predefined number of top similarity scores.

Item space mapper and similarity manager 170 provides the produced suggested replacement item codes for the out-of-stock item code along with the similarity scores to item substitution manager 190. Item substitution manager 190 provides the suggested substitute/replacement item code most likely to be purchased back to the original requester (components 120-160). Components 120-160 provide final transaction feedback, which is derivable/detectable from the transaction details of a given transaction that received a suggested substitute/replacement code from enterprise data store 110 by substitution manager 190 based on whether or not the substitute/replacement item was purchased or not purchased for the given transaction.

As system 100 is deployed, feedback is monitored for the actual transactions that were provided suggested substitute/replacement item codes for given out-of-stock item codes. The feedback is an indication as to whether the suggested substitute/replacement item code was or was not purchased by a customer for a given transaction. A purchase is positive feedback whereas a non-purchase is negative feedback.

One or more MLAs 180 are trained on input comprising an out-of-stock item code, suggested substitute/replacement item codes, the similarity scores provided by item space mapper and similarity manager 170, and a customer vector for the customer associated with the training transaction. The trained MLAs 180 represented a machine-learning model used for a specific application based on item affinities. Thus, as used herein MLA 180 may also be referred to as a machine-learning model.

In a similar manner to what was discussed above, a customer's transaction history can be provided as sentences to another Word2Vec algorithm and all produced vectors aggregated into a single customer vector representing the transaction history and preferences of the specific customer.

The trained result to which the MLAs 180 configure to achieve based on the provided input parameters (out-of-stock item code, suggested substitute/replacement item codes, similarity scores, and customer vector) is a selection of a specific substitute/replacement code where the feedback indicates the given customer actually purchased for the given transaction.

Once the MLAs 180 are trained, Item substitution manager 190 receives in real-time an out-of-stock item code for a given transaction. Item space mapper and similarity manager 170 returns substitute/replacement item codes and corresponding similarity scores between the substitute/replacement item codes and the out-of-stock item code to item substitution manager 190. Item substitution manager 190 provides a customer vector for the customer associated with the given transaction, the out-of-stock item code, the substitute/replacement item codes, and the similarity scores as input to MLA 180 and receives as output a specific substitute/replacement item code that is most likely to produce a purchase for the transaction by the specific customer. After the transaction, the feedback is received as an indication for whether the specific suggested replacement item was or was not purchased.

The MLAs 180 are continually retrained, and the item code vectors along with the item codes updated at configured intervals using updated product catalogues, new transaction data, and the feedback. This ensures that substitute/replacement items for specific out-of-stock items are tailored to a given store's product catalogue and a specific customer. In this way, the accuracy and success of suggested substitute/replacement items is continuously improving and learning.

Components 170-190 may be provided as a web-based and/or cloud-based service to retailers wherein an API to the service is provided to access each retailer's enterprise data store 110 and communicate substitute/replacement item codes during transactions. The API permits a management app 160 for use by managers to obtain substitute/replacement item codes for out-of-stock items on shelves of the retailer to ensure that the shelves are stocked with the substitute/replacement items most likely to generate sales revenue for the given retailer based on that retailer's transaction data, that retailer's customer base, and that retailer's specific product catalogue.

User-operated devices 140 can be any consumer-operated device, such as wearable processing devices, voice-enabled network appliances (Internet-of-Things (IoTs) devices), laptops, desktops, tablets, network-based vehicle-integrated devices, and others. Devices 140 can also be operated by pickers associated with picking system 150. Devices 140 utilize retailer-provided interfaces (web-based and/or app-based interfaces) to perform shopping and transaction basket checkouts with transaction services of network servers 120.

Transaction terminals 120 can be Point-Of-Sale (POS) terminals, Self-Service Terminals (SSTs), staff-operated mobile devices, and/or kiosks.

Figure 1B:
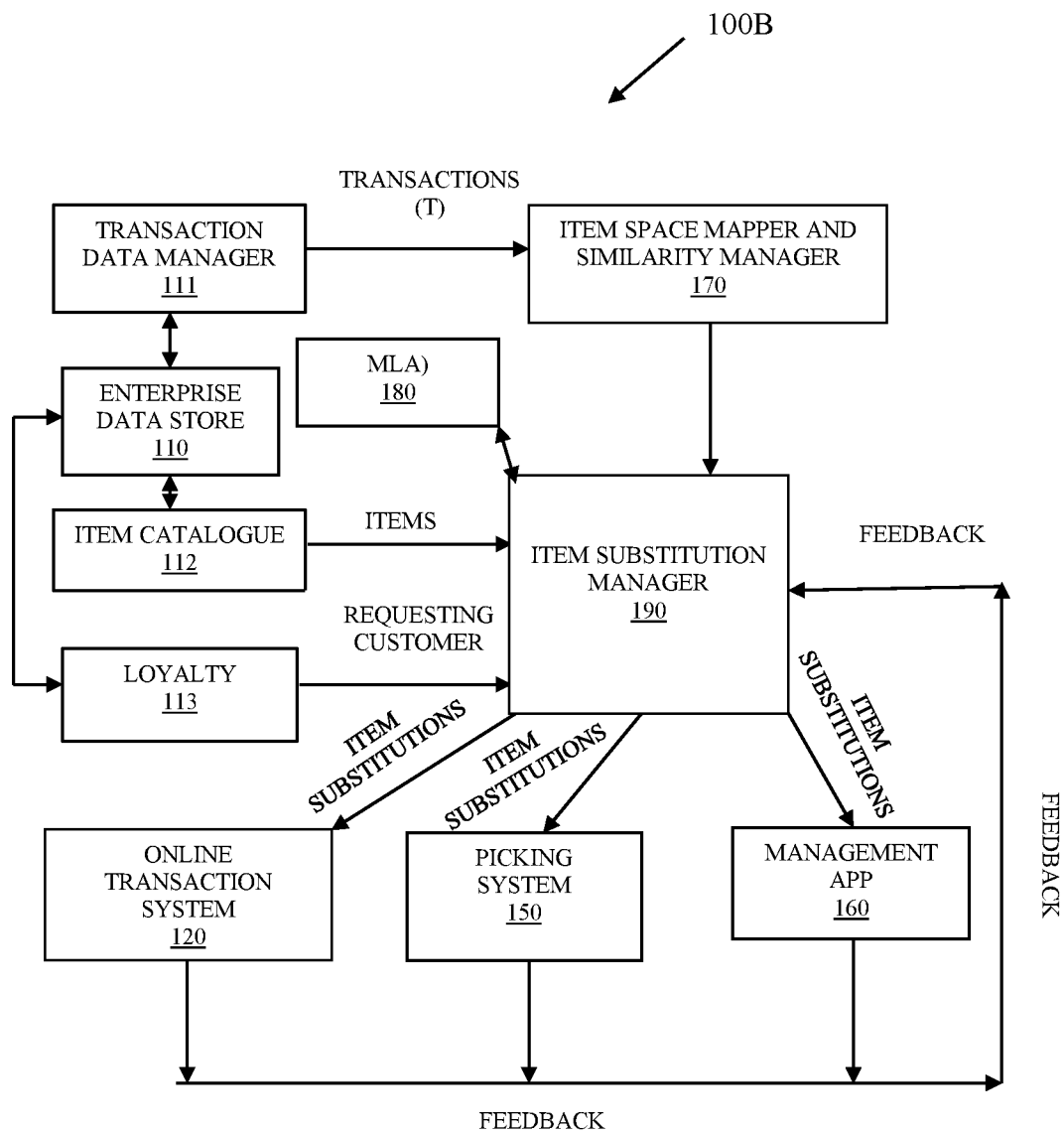
FIG. 1B is a diagram representing a process flow of the system of FIG. 1A, according to an example embodiment.

FIG. 1B is a diagram representing a process flow 100B of the system of FIG. 1A, according to an example embodiment.

FIG. 1B illustrates a more fine-grain view of some components associated with system 100A.

Transaction data manager 111 provides transaction data from enterprise data store to item space mapper and similarity manager 170. Item space mapper and similarity manager 170 generates the multidimensional vector space and unique vectors plotted within that space for each item code of the item catalogue 112.

Item substitution manager 190 trains the MLAs 180 based on item catalogue codes, substitute/replacement item codes and similarity values provided by item space mapper and similarity manager 170, customer vectors for customers obtained from loyalty transaction data 113, and feedback obtained for each customer across multiple channels where transaction were conducted or fulfilled for the customer by online transaction system 120, picking system 150, and management app 160.

Subsequently, when any given transaction of a customer (via online transaction system), any given out-of-stock item for a shelf of a given store (via management app 160), or order fulfillment for a given customer (via picking system 150) requests a substitute/replacement item for an out-of-stock item, item substitution manager requests item space mapper and similarity manager 170 provide substitute/replacement item codes and similarity values for the out-of-stock item based on the vector space and item code vectors. Item substitution manager 190 provides as input to MLA 180, the out-of-stock item code, the substitute/replacement item codes and corresponding similarity values, and customer vector for the customer. MLA 180 provides as output a selection from the substitute replacement item codes best tailored for the customer or best tailored for the retailer store in the case of an out-of-stock shelf. Item substitution manager 190 using an API to communicate the selected optimal substitute/replacement item code tailored for the given situation to the corresponding requestor (online transaction system 120, picking system 150, or management app 160). Results positive or negative are fed back to item substitution manager 190 through the API or derived by item substitution manager 190 from final transaction data or sales date in the case of management app 160. The feedback is used in subsequent training sessions of MLA 180.

In an embodiment, components 110-113 and 170-190 are provided as a single cloud-based surface to components 120, 150, and 160 via an API.

These and other embodiments are now discussed with reference to the FIGS. 2-3.

Figure 2:
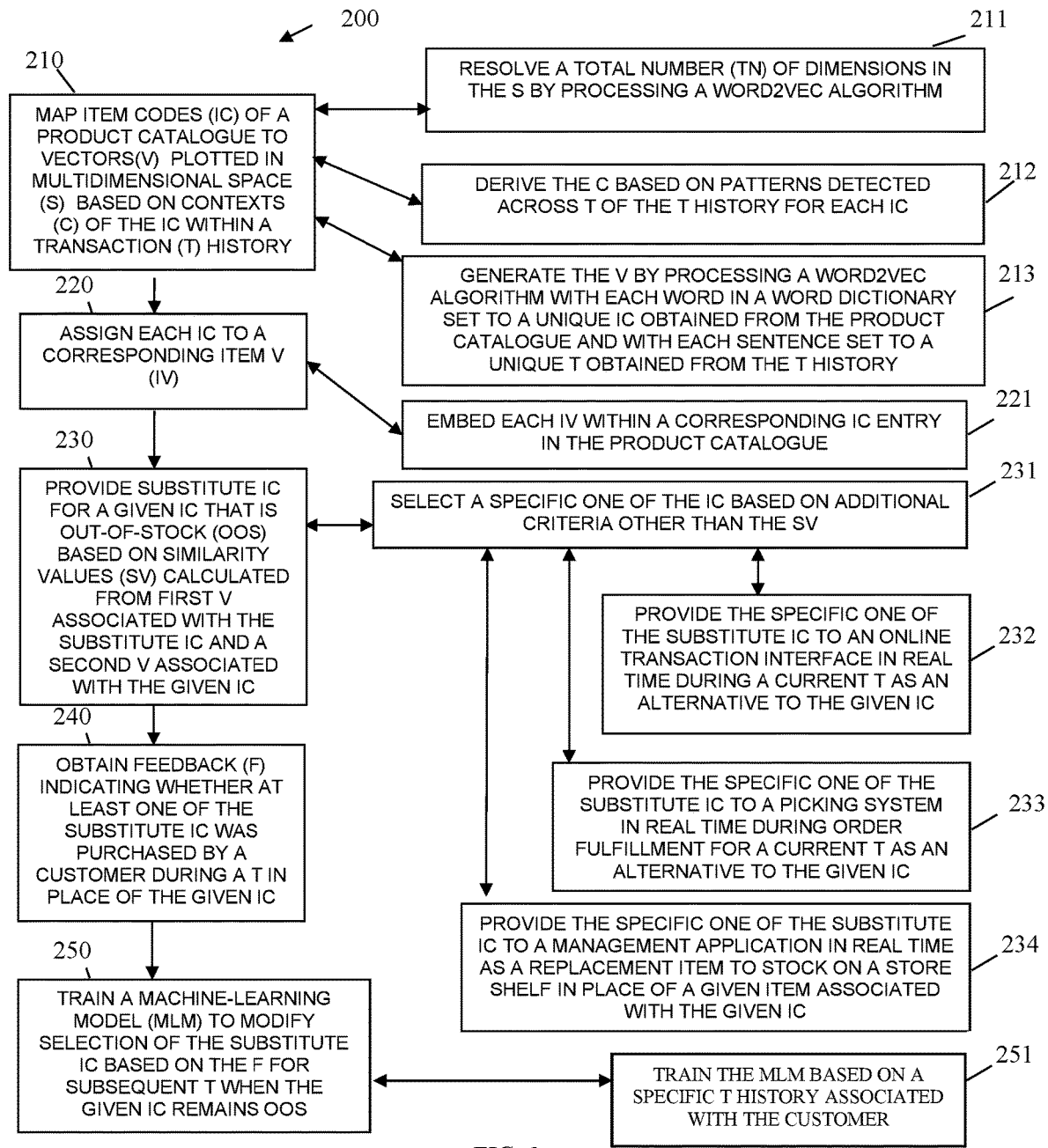
FIG. 2 is a diagram of a method for item affinity processing, according to an example embodiment.

FIG. 2 is a diagram of a method 200 for item affinity processing, according to an example embodiment. The software module(s) that implements the method 200 is referred to as a "substitute item suggestion manager." The substitute item suggestion manager is implemented as executable instructions programmed and residing within memory and/or a non-transitory computer-readable (processor-readable) storage medium and executed by one or more processors of a device. The processor(s) of the device that executes the substitute item suggestion manager are specifically configured and programmed to process the substitute item suggestion manager. The substitute item suggestion manager has access to one or more network connections during its processing. The network connections can be wired, wireless, or a combination of wired and wireless.

In an embodiment, the device that executes the substitute item suggestion manager is a server. In an embodiment, the server is a cloud processing environment that comprises multiple servers cooperating with one another as a single server. In an embodiment, the server is a Local Area Network (LAN) server.

In an embodiment, the device that executes the substitute item suggestion manager is a network-edge device that is local or on an edge of a LAN of a retail store.

In an embodiment, the substitute item suggestion manager is all of or some combination of 170-190.

In an embodiment, the substitute item suggestion manager performs the processing discussed above with system 100A and process flow 1006.

In an embodiment, the substitute item suggestion manager is provided as a SaaS to a plurality of enterprises, each enterprise having a subscription relevant to its customers and enterprise data store 110.

At 210, the substitute item suggestion manager maps item codes for items of a product catalogue to vectors plotted in multidimensional space based on contexts of the item codes appearing within transaction histories. This was discussed above with respect to the processing of the item space mapper and similarity manager 170.

In an embodiment, at 211, the substitute item suggestion manager resolves a total number of dimensions in the multidimensional space by processing a Word2Vec algorithm.

In an embodiment, at 212, the substitute item suggestion manager derives the contexts based on patterns detected across transaction of the transaction history for each item code.

In an embodiment, at 213, the substitute item suggestion manager generates the vectors by processing a Word2Vec algorithm with each word in the word dictionary set to a unique item code obtained from the product catalogue and with each sentence set to a unique transaction obtained from the transaction history.

At 220, the substitute item suggestion manager assigns each item code to a corresponding item vector.

In an embodiment, at 221, the substitute item suggestion manager embeds each item vector within a corresponding entry in the product catalogue for the corresponding item code.

At 230, the substitute item suggestion manager provides substitute item codes for a given item code that is out-of-stock based on similarity values calculated from first vectors associated with the substitute item codes and a second vector associated with the given item code.

In an embodiment, at 231, the substitute item suggestion manager selects a specific one of the item codes based on additional criteria other than the similarity values.

In an embodiment of 231 and at 232, the substitute item suggestion manager provides the specific one of the substitute item codes to an online transaction system in real time during a current transaction as an alternative to the given item.

In an embodiment of 231 and at 233, the substitute item suggestion manager provides the specific one of the substitute item codes to a picking or order fulfillment system in real time during order fulfillment or order picking for a current transaction or a current order as an alternative to the given item code.

In an embodiment of 231 and at 234, the substitute item suggestion manager provides the specific one of the substitute item codes to a management application in real time as a replacement item to stock on a store shelf in place of a given item associated with the given item code.

In an embodiment, the substitute item suggestion manager provides the specific one of the substitute item codes in real time to each of the online transaction system 120, the picking system 150, and the management application 160 when the given item is out-of-stock.

In an embodiment, at 240, the substitute item suggestion manager obtains feedback indicating whether at least one of the substitute item codes was purchased by a customer during a transaction in place of the given item code.

In an embodiment, at 250, the substitute item suggestion manager trains a machine-learning model 180 to modify selection of the substitute item codes based on the feedback for subsequent transactions when the given item code remains out-of-stock.

In an embodiment, at 251, the substitute item suggestion manager trains the machine-learning model 180 based on a specific transaction history associated with the customer.

Figure 3:
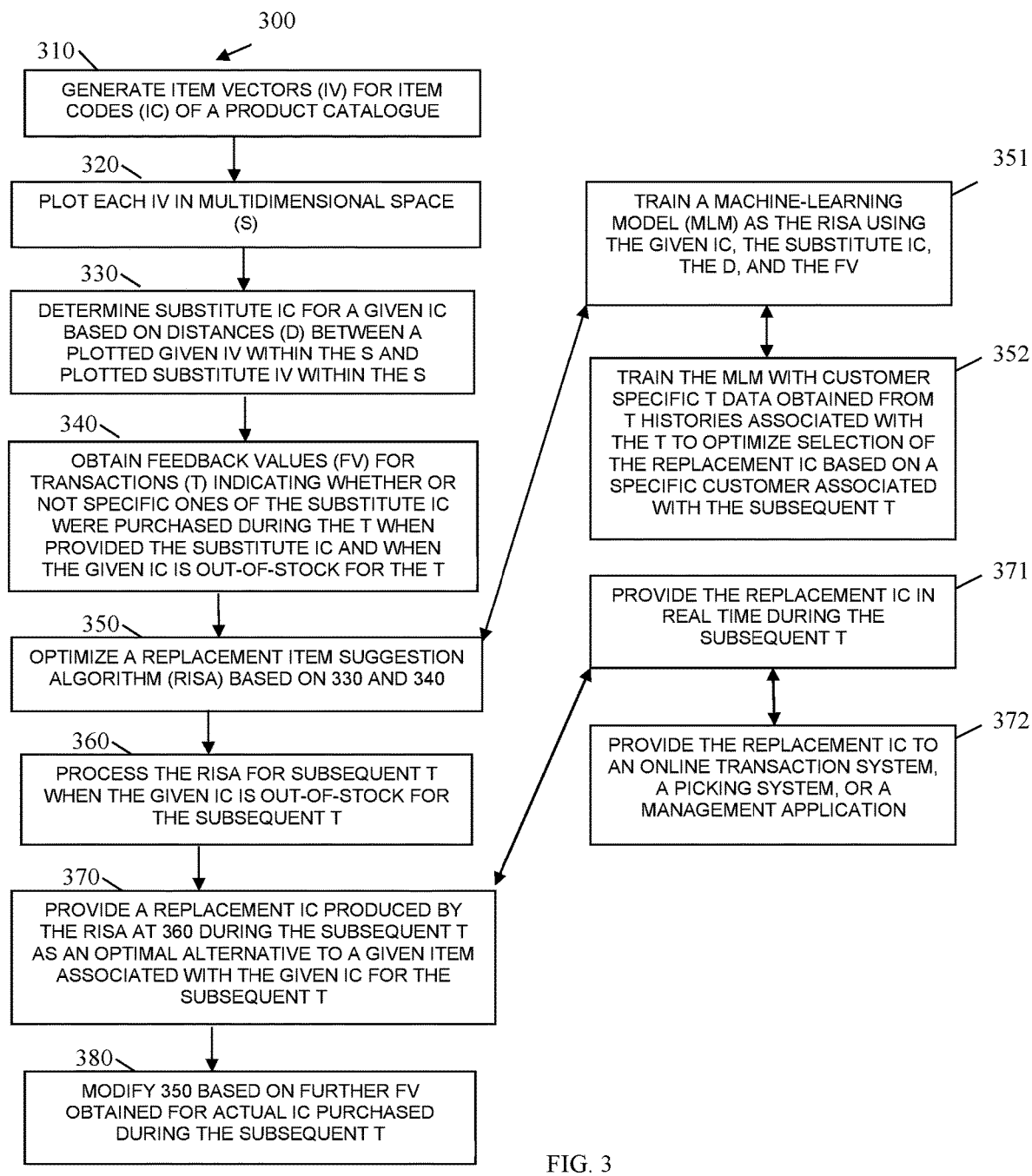
FIG. 3 is a diagram of another method for item affinity processing, according to an example embodiment.

FIG. 3 is a diagram of another method 300 for item affinity processing, according to an example embodiment. The software module(s) that implements the method 300 is referred to as an "out-of-stock item replacement optimizer." The out-of-stock item replacement optimizer is implemented as executable instructions programmed and residing within memory and/or a non-transitory computer-readable (processor-readable) storage medium and executed by one or more processors of a device. The processors that execute the out-of-stock item replacement optimizer are specifically configured and programmed to process the out-of-stock item replacement optimizer. The out-of-stock item replacement optimizer has access to one or more network connections during its processing. The network connections can be wired, wireless, or a combination of wired and wireless.

In an embodiment, the device that executes the out-of-stock item replacement optimizer is a server. In an embodiment, the server is a cloud processing environment that comprises multiple servers cooperating with one another as a single server. In an embodiment, the server is a LAN server that is local to a retail store.

In an embodiment, the device that executes the out-of-stock item replacement optimizer is a network-edge device that is on the edge of a LAN for a retail store.

In an embodiment, the out-of-stock item replacement optimizer is all or some combination of 170-190, process flow 1006, and/or the method 200.

The out-of-stock item replacement optimizer presents another and, in some ways, enhanced processing perspective to that which was described above with the FIG. 2.

At 310, the out-of-stock item replacement optimizer generates item vectors for item codes of a product catalogue.

At 320, the out-of-stock item replacement optimizer plots each item vector in multidimensional space.

At 330, the out-of-stock item replacement optimizer determines substitute item codes for a given item code based on distances calculated between a plotted given item vector within the multidimensional space and plotted substitute item vectors within the multidimensional space.

At 340, the out-of-stock item replacement optimizer obtains feedback values for transactions indicating whether or not specific ones of the substitute item codes were purchased during the transactions when provided the substitute item codes and when the given item code is out-of-stock for the transactions.

At 350, the out-of-stock item replacement optimizer optimizes a replacement item suggestion algorithm based on 330 and 340.

In an embodiment, at 351, the out-of-stock item replacement optimizer trains a machine-learning model 180 as the replacement item suggestion algorithm using the given item code, the substitute item codes, the distances between the plotted given item code vector and each of the plotted substitute item code vectors within the multidimensional space, and the feedback values.

In an embodiment of 351 and at 352, the out-of-stock item replacement optimizer further trains the machine-learning model with customer specific transaction data obtained from the transaction histories associated with the transactions to optimize selection of the replacement item code based on a specific customer associated with the subsequent transactions. In an embodiment, the customer specific transaction data is an aggregated customer transaction vector associated with the transaction history of the specific customer.

At 360, the out-of-stock item replacement optimizer processes the replacement item suggestion algorithm for subsequent transactions when the given item code is out-of-stock for the subsequent transactions.

At 370, the out-of-stock item replacement optimizer provides a replacement item code produced by the replacement item suggestion algorithm during the subsequent transactions as an optimal alternative to a given item associated with the given item code for the subsequent transactions.

In an embodiment, at 371, the out-of-stock item replacement optimizer provides the replacement item code in real time during the subsequent transactions.

In an embodiment of 371 and at 372, the out-of-stock item replacement optimizer provides the replacement item code to an online transaction system 120, a picking system 150, and/or a management application 160.

In an embodiment, at 380, the out-of-stock item replacement optimizer modifies 350 based on further feedback values obtained for actual item codes purchased during the subsequent transactions. That is, the replacement item suggestion algorithm is continuously optimized and learns through adjustments made based on the further feedback values.

In an embodiment of 380 and at 381, the out-of-stock item replacement optimizer provides It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
providing executable instructions to a processor of a server and causing the processor to execute the executable instructions and perform operations comprising:
mapping item codes of a product catalogue to item vectors plotted in multidimensional space based on contexts of the item codes within a transaction history, wherein mapping further includes deriving the contexts based on patterns detected across transactions of the transaction history for each item code;
assigning each item code to a corresponding item vector;
providing substitute item codes for a given item code that is out-of-stock based on similarity values calculated from distances within the multidimensional space between first vectors associated with the substitute item codes and a second vector associated with the given item code, wherein providing the substitute item codes further includes adjusting the substitute item codes based on feedback associated with previous substitute item codes for the given item code that was purchased by a customer or that was not purchased by the customer;
providing the substitute item codes in real time to a transaction interface, a picking system, or a management application for a current transaction being processed, restocking being processed, or a current order being processed; and
providing and processing the method as a data driven item substitution cloud service predicter to the transaction interface during transactions, the picking system during order fulfillment, and the management application during restocking activities at a store, wherein the data driven item substitution cloud service predicter is provided as a software-as-a-service to the transaction interface, the picking system, and the management application through an application programming interface.

2. The method of claim 1 further includes causing the processor to perform additional operations comprising obtaining current feedback indicating whether at least one of the substitute item codes was purchased by a given customer during a given transaction in place of the given item code.

3. The method of claim 2 further includes causing the processor to perform further operations comprising training a machine-learning model to modify selection of the substitute item codes based on the feedback for subsequent transactions when the given item code remains out-of-stock.

4. The method of claim 3, wherein training further includes training the machine-learning model based on a specific transaction history associated with the customer.

5. The method of claim 1, wherein mapping further includes resolving a total number of dimensions in the multidimensional space by processing a Word2Vec algorithm.

6. The method of claim 1, wherein mapping further includes generating the vectors by processing a Word2Vec algorithm with each word in a word dictionary set to a unique item code obtained from the product catalogue and with each sentence set to a unique transaction obtained from the transaction history.

7. The method of claim 1, wherein assigning further includes embedding each item vector within a corresponding item code entry in the product catalogue.

8. The method of claim 1, wherein providing further includes selecting a specific one of the substitute item codes based on additional criteria other than the similarity values.

9. The method of claim 8, wherein providing further includes providing the specific one of the substitute item codes to an online transaction interface in real time during the current transaction as an alternative to the given item code.

10. The method of claim 8, wherein providing further includes providing the specific one of the substitute item codes to the picking system in real time during order fulfillment for the current order as an alternative to the given item code.

11. The method of claim 8, wherein providing further includes providing the specific one of the substitute item codes to the management application in real time as a replacement item to stock on a store shelf in place of a given item associated with the given item code during the restocking.

12. A system, comprising:
at least one processing device of a cloud server having at least one processor configured to execute instructions from a non-transitory computer-readable storage medium;
the instructions when executed by the at least one processor from the non-transitory computer-readable storage medium cause the at least processor to perform operations comprising:
mapping item codes from a product catalogue to vectors plotted in multidimensional space, wherein mapping further includes deriving the contexts based on patterns detected across transactions of a transaction history for each item code, wherein mapping further includes mapping the item codes to the vectors based on the corresponding contexts;
determining similarities between a given item code and other item codes based on the corresponding vectors plotted in the multidimensional space and distances calculated between the vectors for the item codes within the multidimensional space;
selecting a replacement item code for the given item code based on the similarities defined for the corresponding distances and based on feedback values observed for transactions associated with the given item code when the given item code was out-of-stock and unavailable for purchase with the transactions and candidate replacement item codes where provided but not purchased by given customers for the given item code;
providing the replacement item code in real time to subsequent transactions, order fulfillments, and alternative item shelf replenishment requests when the given item code is out-of-stock, unavailable for purchase with the subsequent transactions, unavailable to fulfill orders with the order fulfillments, and unavailable for stocking on a shelf of a store with the alternative item shelf replenishment requests during current transactions being processed by transaction interfaces, during current order fulfillment being processed by a picking system, or during restocking being processed by a management application; and
providing and processing the instructions as a data driven item substitution cloud service predicter to the transaction interfaces during transactions, the picking system during order fulfillment, and the management application during restocking activities at a store, wherein the data driven item substitution cloud service predicter is provided as a software-as-a-service to the transaction interfaces, the picking system, and the management application through an application programming interface.

13. The system of claim 12, wherein the data driven item substitution cloud service predicter performs the operations in real time over network connections to online transaction systems associated with the subsequent transactions, picking systems associated with the order fulfillments, and management applications associated with the alternative item shelf replenishment requests.

* * * * *